H. Kuhlmann,

Churn.

No. 106,836.

Patented Aug. 30, 1870.

Witnesses:

Inventor:

United States Patent Office.

HERMANN KUHLMANN, OF CINCINNATI, OHIO.

Letters Patent No. 106,836, dated August 30, 1870.

IMPROVEMENT IN CHURNS.

The Schedule referred to in these Letters Patent and making part of the same

*To all whom it may concern:*

Be it known that I, HERMANN KUHLMANN, of Cincinnati, in the county of Hamilton and State of Ohio, have invented a new and improved Churn; and I do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
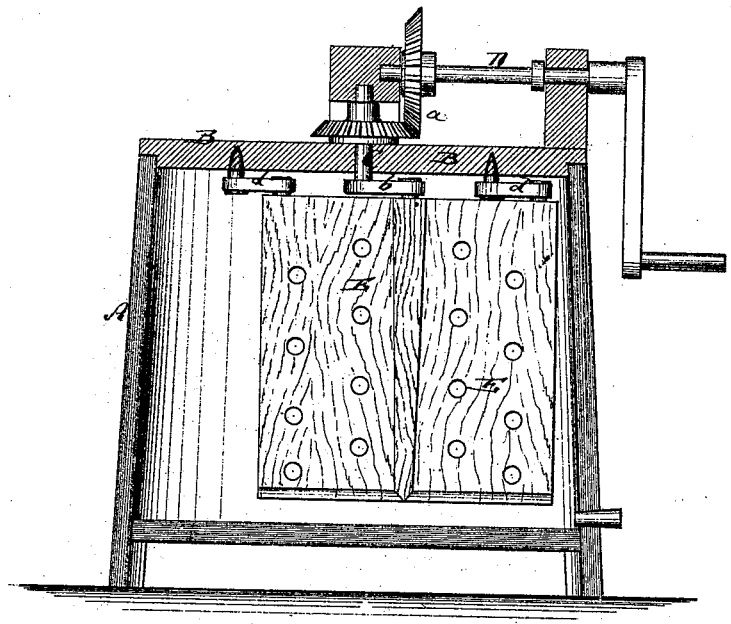
Figure 1 represents a vertical central section of my improved churn.
Figure 2:
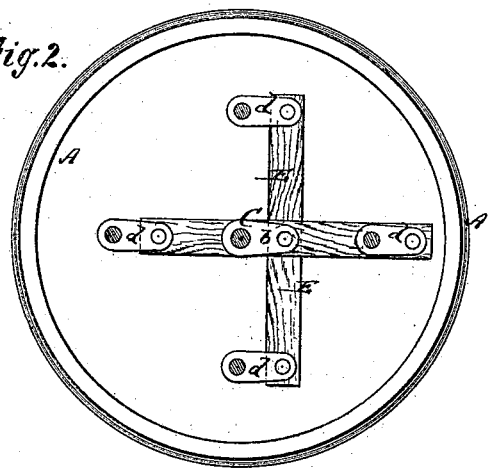
Figure 2 is a plan view of the same, the cover being removed.

This invention relates to a new mechanism for op- operating churn-dashers, and has for its object to facilitate the production of butter by a thorough agitation of the cream.

The invention consists, chiefly, in suspending the dasher from a crank-shaft and a set of false cranks, in such manner that it will be carried around said shaft, but not around its own axis, so as to act with each of its wings in a different direction.

A in the drawing represents the body of the churn. B is the cover of the same.

Through the center of the cover is fitted a vertical shaft, C, which is, by means of gearing $a\ a$, or otherwise, connected with a horizontal shaft, D, that has its bearings in ears projecting from the cover.

The shaft C terminates directly below the cover B, in a crank, $b$, which is secured to the middle of the dasher E.

This dasher is made of wood or other suitable material, and consists of four, more or less, perforated wings that radiate from a common center.

The wings are beveled at their lower ends, for the purpose of overcoming friction, and for also agitating the cream under the dasher.

The ends of the wings are, by means of false cranks $d\ d$, connected with the cover, the said cranks $d$ being exactly parallel with the crank $b$. When the shaft C is revolved by means of the driving-shaft D, it will revolve the crank $b$, and all the other cranks $d$ will rotate with it, so as to carry the dasher around the fixed centers of the cranks, but not around its own axis.

The action of each wing upon the cream will, therefore, be more confined to the range of such wing, and more thorough than where all the wings rotated in the same direction, around one center.

By my improved mechanism the dashers are all moved in different planes, and crowd the cream against the sides of the churn.

Having thus described my invention,

I claim as new and desire to secure by Letters Patent—

The winged churn-dasher, suspended from and actuated by means of cranks $b$ and $d$, substantially as herein shown and described.

HERMANN KUHLMANN.

Witnesses:
H. ROSSWINKEL,
S. LUKEN.